United States Patent [19]
Alexander, Jr. et al.

[11] Patent Number: 5,936,936
[45] Date of Patent: Aug. 10, 1999

[54] REDUNDANCY MECHANISMS FOR CLASSICAL INTERNET PROTOCOL OVER ASYNCHRONOUS TRANSFER MODE NETWORKS

[75] Inventors: Cedell Adam Alexander, Jr., Durham; Timothy James Smith, Raleigh; Colin Beaton Verrilli, Apex; Rama Mohan Yedavalli, Raleigh, all of N.C.

[73] Assignee: International Business Machines Corporation, Armonk, N.Y.

[21] Appl. No.: 08/826,988

[22] Filed: Apr. 11, 1997

[51] Int. Cl.$^6$ ........................................................ H04J 3/14
[52] U.S. Cl. ............................................. 370/216; 370/395
[58] Field of Search ........................................ 370/395, 396, 370/397, 398, 399, 216, 217, 218, 219, 220, 241, 242, 244, 245, 250, 252, 401, 402; 395/200.75

[56] References Cited

U.S. PATENT DOCUMENTS

| | | | |
|---|---|---|---|
| 5,581,552 | 12/1996 | Civanlar et al. | 370/396 |
| 5,600,644 | 2/1997 | Chang | 370/404 |
| 5,617,540 | 4/1997 | Civanlar et al. | 395/200.11 |
| 5,809,233 | 9/1998 | Shur | 370/402 |
| 5,828,844 | 10/1998 | Civanlar et al. | 370/396 |

OTHER PUBLICATIONS

IBM Technical Disclosure Bulletin, "Method for Improving Network Availability with Redundant Network Servers", vol. 39, No. 8 pp. 195–196, Aug. 1996.

*Primary Examiner*—Huy D. Vu
*Attorney, Agent, or Firm*—John J. Timar; Felsman, Bradley, Gunter & Dillon, LLP

[57] ABSTRACT

A primary ARP server and a backup ARP server are connected to an ATM communications network. The primary and backup ARP servers each have associated ATM addresses. Also, a LIS is connected to the ATM communications network. Either the primary or backup ARP server is the active ARP server and resolves IP addresses to ATM addresses for the LIS. When the backup ARP server recognizes the removal of a redundancy virtual channel connection (VCC) between the backup ARP server and the primary ARP server, the backup ARP server registers using the ATM address associated with the primary ARP server. This allows the backup ARP server to take over for the primary ARP server to become the active ARP server.

In addition, a primary default gateway and a backup default gateway are connected to the ATM communications network. These default gateways have associated ATM addresses. One of the primary and backup default gateways is active at a time. The active default gateway provides routing services for hosts that do not run routing topology protocols. When the backup default gateway recognizes the removal of a redundancy virtual channel connection (VCC) between the backup default gateway and the primary default gateway, the backup default gateway registers a mapping between the ATM address associated with the backup default gateway and an IP address of the default gateway. In this manner the backup default gateway takes over for the primary default gateway to become the active default gateway.

20 Claims, 5 Drawing Sheets

REDUNDANCY MECHANISMS FOR CLASSICAL INTERNET PROTOCOL OVER ASYNCHRONOUS TRANSFER MODE NETWORKS

BACKGROUND OF THE INVENTION

1. Technical Field

The present invention relates generally to transmitting data over asynchronous transfer mode (ATM) networks according to the Internet Protocol (IP). More specifically, the present invention relates to providing redundant address resolution protocol (ARP) servers and default gateways which enhance the reliability of IP networks implemented using ATM technology.

2. Description of the Related Art

Due to the widespread acceptance of the current IP standard for communicating data, this standard has been adapted for use with ATM devices. Currently, the standard solution for natively sending IP traffic over an ATM interface is specified by the Internet Engineering Task Force (IETF) and is described by M. Laubach in a document entitled "Classical IP and ARP over ATM," RFC 1577, Hewlett-Packard Laboratories, January 1994.

Using the particular benefits of ATM technology, clients connected to an ATM network which supports IP can be grouped together into logical IP subnets (LISs). Membership in a particular LIS is not based on the physical location of the station. Instead, logically related stations are grouped together into the same LIS. Adding and removing stations from a LIS is very simple, due to the ease with which a client can register with an ARP server.

In addition to clients, other components are usually associated with a LIS. An ATMARP server is usually connected to a LIS. The role of an ATMARP server is to provide IP-to-ATM address mappings to requesting ATMARP clients. Also, a LIS is usually connected to a default gateway. A default gateway provides routing services for hosts that do not run routing topology protocols (e.g., open shortest path first (OSPF)— a link-state routing protocol specified by the IETF). Such hosts are commonly configured with the IP address of their default gateway.

In previous ATM systems, both the ATMARP server and the default gateway were potentially single points of failure. If the ATMARP server failed, ATMARP clients would no longer be able to resolve IP addresses to ATM addresses, and would therefore not be able to establish new virtual channel connections (VCCs). Also, the failure of the ATMARP server would result in ATMARP clients not being able to refresh existing mappings via the ATMARP server. Thus, the failure of an ATMARP server would severely reduce the communication capabilities of the LIS to which it was attached. The failure of a LIS's default gateway results in the hosts which are configured with the IP address of the failed default gateway losing routing services. The loss of routing services results in these hosts not being able to communicate with stations on other subnets.

Providing backup ATMARP servers and default gateways would eliminate the single points of failure. Such backup devices should be able to quickly and efficiently take over the responsibilities of the primary device if the primary device fails. Also, it would be desirable for the backup ATMARP servers and default gateways to integrate easily into existing systems, and to employ simple and reliable methods for taking over the responsibilities of the failed primary device, and of relinquishing control when the primary device comes back on-line.

SUMMARY OF THE INVENTION

It is therefore one object of the present invention to provide for redundant ATMARP servers and default gateways.

It is another object of the present invention to provide for the simple and efficient integration of these redundant devices into existing systems.

It is yet another object of the present invention to provide a simple and efficient method of communicating between the redundant devices so that one redundant device knows the state of the other.

The foregoing objectives are achieved as follows. A primary ARP server and a backup ARP server are connected to an ATM communications network. The primary and backup ARP servers each have associated ATM addresses. Also, a LIS is connected to the ATM communications network. Either the primary or backup ARP server is the active ARP server and resolves IP addresses to ATM addresses for the LIS. When the backup ARP server recognizes the removal of a redundancy virtual channel connection (VCC) between the backup ARP server and the primary ARP server, the backup ARP server registers using the ATM address associated with the primary ARP server. This allows the backup ARP server to take over for the primary ARP server to become the active ARP server.

In addition, a primary default gateway and a backup default gateway are connected to the ATM communications network. These default gateways have associated ATM addresses. One of the primary and backup default gateways is active at a time. The active default gateway provides routing services for hosts that do not run routing topology protocols. When the backup default gateway recognizes the removal of a redundancy virtual channel connection (VCC) between the backup default gateway and the primary default gateway, the backup default gateway registers a mapping between the ATM address associated with the backup default gateway and an IP address of the default gateway. In this manner the backup default gateway takes over for the primary default gateway to become the active default gateway.

BRIEF DESCRIPTION OF THE DRAWINGS

The novel features believed characteristic of the invention are set forth in the appended claims. The invention itself, however, as well as preferred mode of use, further objectives and advantages thereof, will best be understood by reference to the following detailed description of an illustrative embodiment when read in conjunction with the accompanying drawings, wherein:

DETAILED DESCRIPTION OF PREFERRED EMBODIMENT

Figure 1:
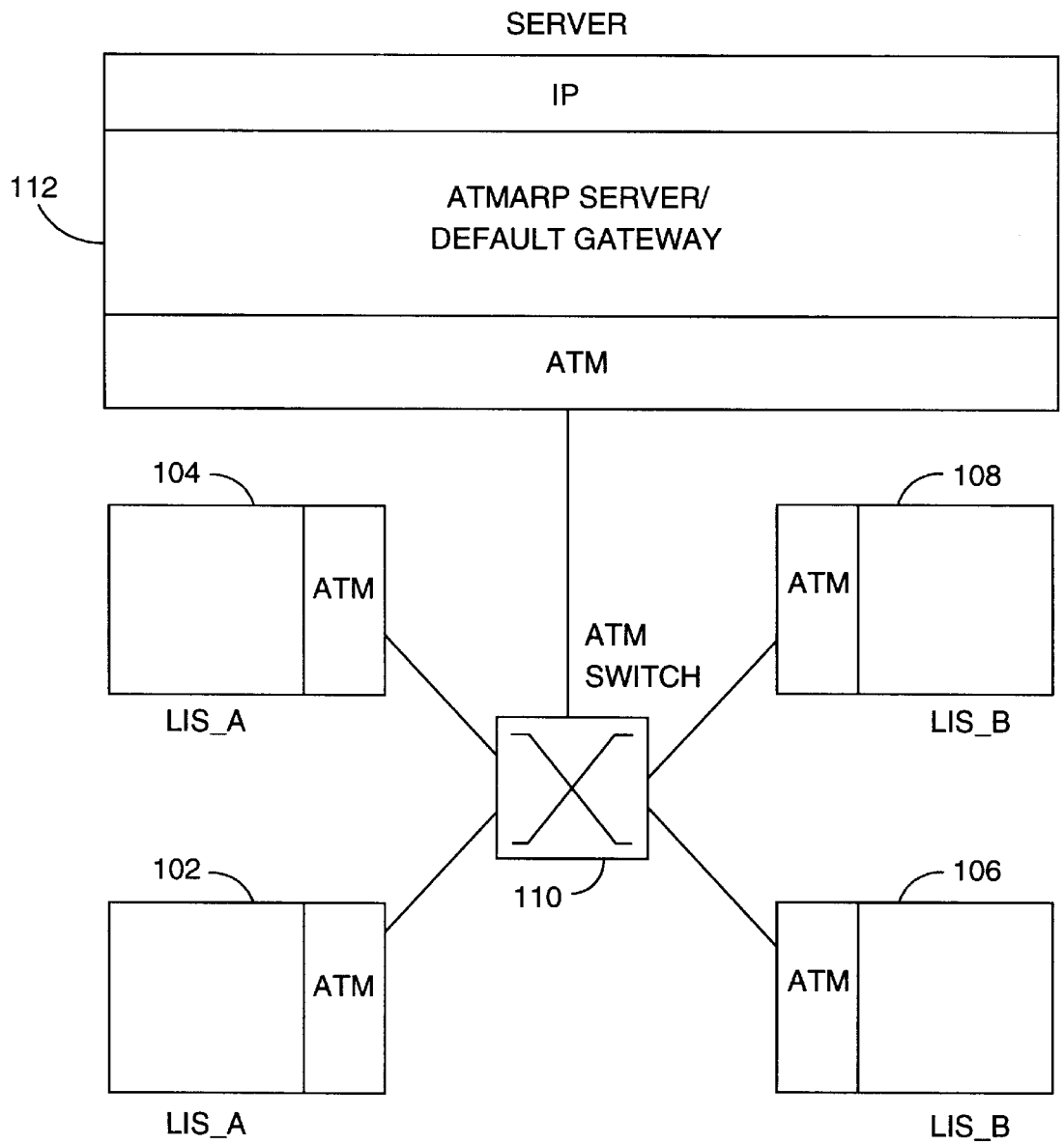
FIG. 1 illustrates the physical layout of an ATM network having two logical internet protocol subnets.

FIG. 1 illustrates a prior art internet protocol (IP) network which utilizes an asynchronous transfer mode (ATM)

switch. Classic IP clients 102, 104, 106, and 108 are all attached to ATM switch 110. IP clients 102 and 104 have been configured so that they both reside in logical internet protocol subnet (LIS) A. Likewise, IP clients 106 and 108 have been configured to reside in LIS B.

Server 112 is also attached to ATM switch 110. Server 112 provides the functionality of both an ATMARP (ATM address resolution protocol) server and a default gateway for both LIS A and LIS B. In other embodiments, the functionality of the ATMARP server and default gateway may be distributed to other computing devices.

In the network shown in FIG. 1, if the ATMARP server or default gateway fails, there is no device to provide backup service.

Figure 2:
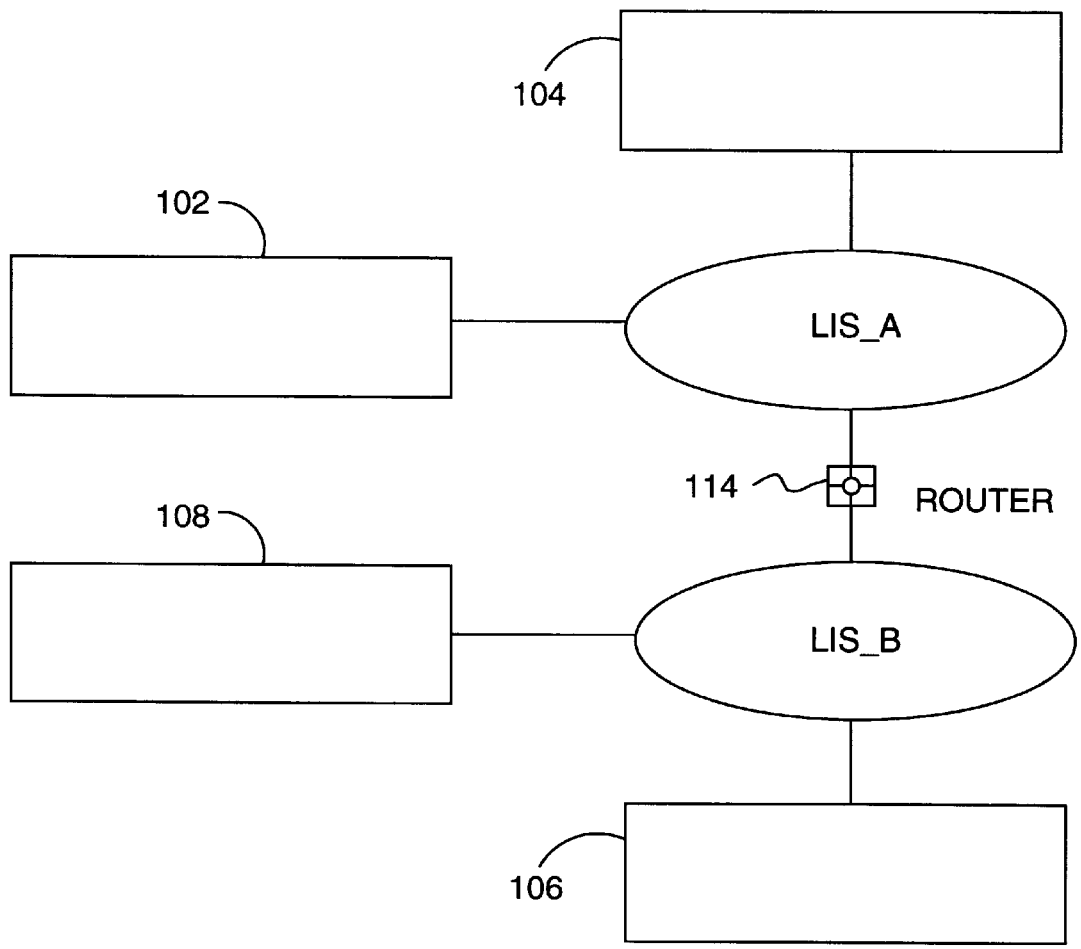
FIG. 2 shows the logical layout of the network shown in FIG. 1.

FIG. 2 illustrates a logical view of the network shown in FIG. 1. IP clients 102 and 104 are attached to LIS A and IP clients 108 and 106 are attached to LIS B. LIS A and LIS B are joined together by router 114. The functionality provided by router 114 shown in FIG. 2 is provided by server 112 as shown in FIG. 1.

Figure 3:
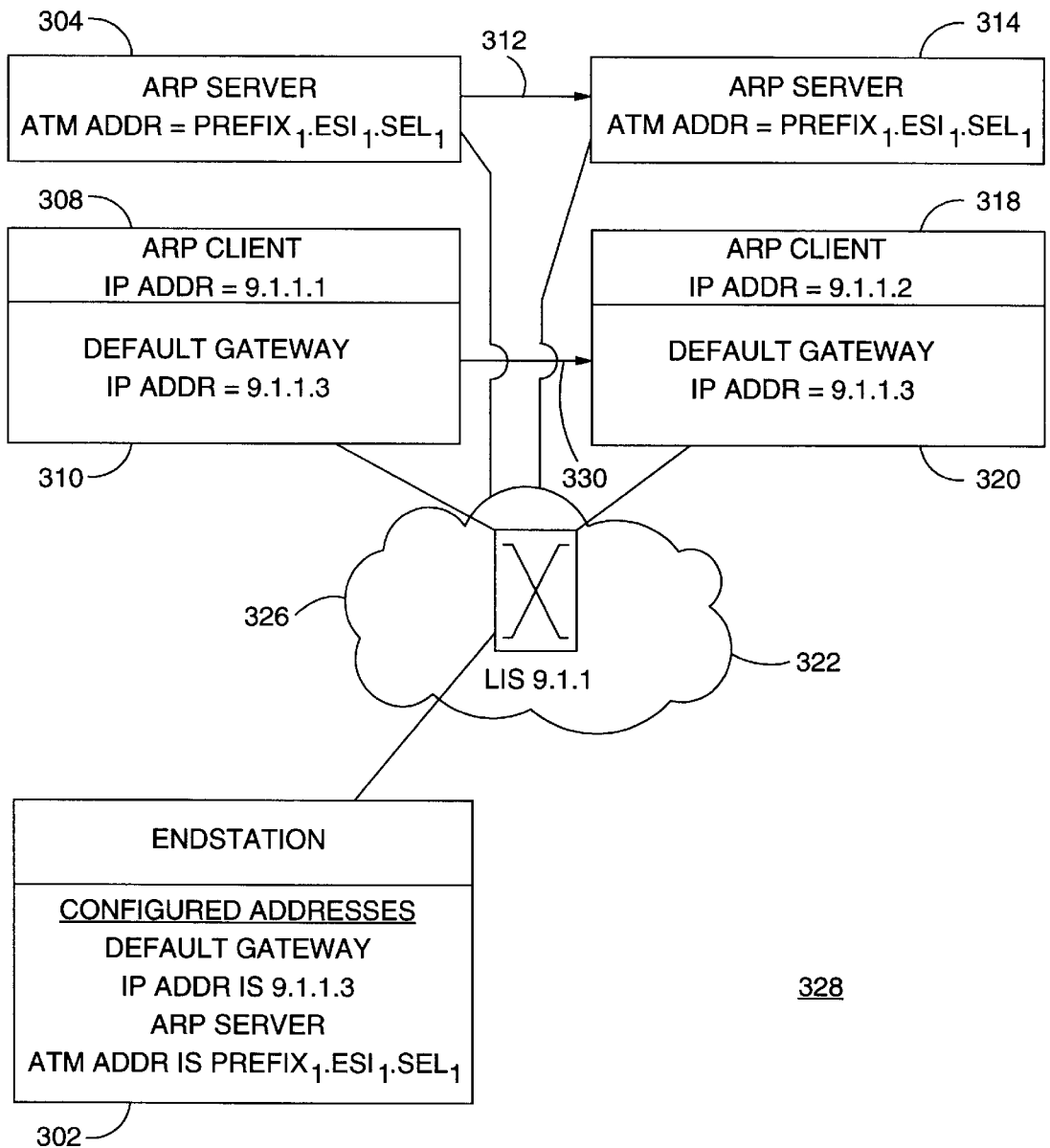
FIG. 3 illustrates the logical layout of a network according to the present invention.

FIG. 3 illustrates a logical representation of a LIS according to the present invention. In network 328, redundant ATMARP servers and default gateways are provided. These redundant servers and gateways eliminate the possibility of a single point failure within a LIS occurring with one of these devices.

ATMARP server redundancy is accomplished by providing a backup ATMARP server and making this backup ATMARP server accessible via the same ATM address as the primary ATMARP server when the primary ATMARP server fails. ATM addresses are typically formed by concatenating a network prefix component provided by the ATM switch with an end system identifier (ESI) and a selector. The ESI and selector components are assigned to devices by the system operator. In order for the backup ATMARP server to assume the same ATM address as the primary ATMARP server, the two servers first must be connected to the same ATM switch, since the ATM switch determines the network prefix component of the ATMARP servers' ATM address. Next, the system operator configures the backup ATMARP server to assume the same ESI and selector components as the primary ATMARP server when the backup ATMARP server becomes active.

As shown in network 328, primary ATMARP server 304 and backup ATMARP server 314 are both connected to ATM switch 326. Being connected to ATM switch 326 ensures that the prefix components of both primary and backup ATMARP servers 304 and 314 are the same. Also, the system operator has specified that backup ATMARP server 314 assume the ESI and selector components of the ATM address of primary ATMARP server 304 when primary ATMARP 304 server fails. As a result of having the same ATM address, the traffic directed to primary ATMARP server 304 will be directed towards backup ATMARP server 314 when backup ATMARP server 314 becomes active.

Redundancy VCC 312 informs backup ATMARP server 314 when to assume the duties of primary ATMARP server 304. Primary ATMARP server 304 is responsible for establishing redundancy VCC 312 to backup ATMARP server 314. When redundancy VCC 312 exists, backup ATMARP server 314 knows that primary ATMARP server 304 is servicing LIS 322. The absence of redundancy VCC 312 indicates to backup ATMARP server 314 that primary ATMARP server 304 has failed and that it should become active.

Upon detecting the absence of redundancy VCC 312, backup ATMARP server 314 attempts to register the ATM address of primary ATMARP server 304 with ATM switch 326. As noted above, when the primary ATMARP server fails, the ATM address assumed by backup ATMARP server 314 is the same as the address of primary ATMARP server 304. When backup ATMARP server 314 successfully registers this ATM address, ATMARP server 314 becomes active and services address resolution request for LIS 322.

When primary ATMARP server 304 comes back on-line, it will attempt to establish redundancy VCC 312 to backup ATMARP server 314. When backup ATMARP server 314 recognizes that redundancy VCC 312 has been reestablished, it deregisters its ATM address with ATM switch 326 so that primary ATMARP server 304 can register its ATM address and begin/resume servicing LIS 322.

The ATM addresses used by primary and backup ATMARP servers 304 and 314 to establish redundancy VCC 312 are different than the ATM addresses used to process ARP requests originating from LIS 322.

Redundant default gateways are provided in a similar manner to that of providing redundant ATMARP servers. However, unlike redundant ATMARP servers, redundant default gateways do not need to be connected to the same ATM switch (although in FIG. 3, the redundant default gateways are connected to the same ATM switch). The redundant default gateways only have to be accessible via the same IP address, but do not need to be accessible via the same ATM address (since the IP-to-ATM address mapping for the redundant default gateways is provided by the ATMARP server).

Initially, backup default gateway 320 is configured with the same IP address as primary default gateway 310. However, backup default gateway 320 does not represent this IP address to the system as long as primary default gateway 310 is active. Backup default gateway 320 recognizes that primary default gateway 310 is active by the existence of redundancy VCC 330. If redundancy VCC 330 is not present, backup default gateway 320 will attempt to register a mapping between its ATM address and the IP address of primary default gateway 310 with whichever ATMARP server is active. After backup default gateway 320 successfully registers the mapping with the active ATMARP server, backup default gateway 320 will become active and provide routing services for packets destined for the default gateway IP address.

When primary default gateway 310 comes on-line, it will reestablish redundancy VCC 330 with backup default gateway 320. When backup default gateway 320 detects that redundancy VCC 330 has been reactivated, it will release any VCCs associated with itself, including the VCC to the active ATMARP server. This allows primary default gateway 310 to begin/resume providing routing services for LIS 322.

To ensure that the default gateway redundancy mechanisms are transparent to routing topology protocols and to maximize switchover responsiveness, both the primary and backup default gateways may also have other, independent IP addresses on LIS 322 that can be used for routing topology protocol purposes. In the example shown in FIG. 3, the default gateway IP address for LIS 322 is 9.1.1.3. ARP Client 308 associated with primary default gateway 310 uses IP address 9.1.1.1 for routing topology purposes, while ARP Client 318 associated with backup default gateway 320 uses IP address 9.1.1.2 for routing topology protocol purposes. Using IP addresses in this manner allows for the default gateway IP address to be restricted to IP ARPs and network management functions such as pings. This also allows the backup default gateway to provide non-default gateway routing functions when the primary default gateway is active (e.g., intermediate routing of traffic traversing, but not originating from, LIS 322). Switchover responsiveness in the event of failure is also enhanced, since the backup default gateway on the LIS can be included in a routing topology data base before a failure has occurred.

Network 328 in FIG. 3 depicts the primary and backup ATMARP servers and default gateways being independent from one another, with separate VCCs for the ATMARP servers and for the default gateways. In other embodiments, an ATMARP server and default gateway could be located within the same server unit. Also, the ATMARP server and default gateway located within the same server unit can share a single redundancy VCC with another ATMARP server/default gateway pair located in another server unit.

Figure 4:
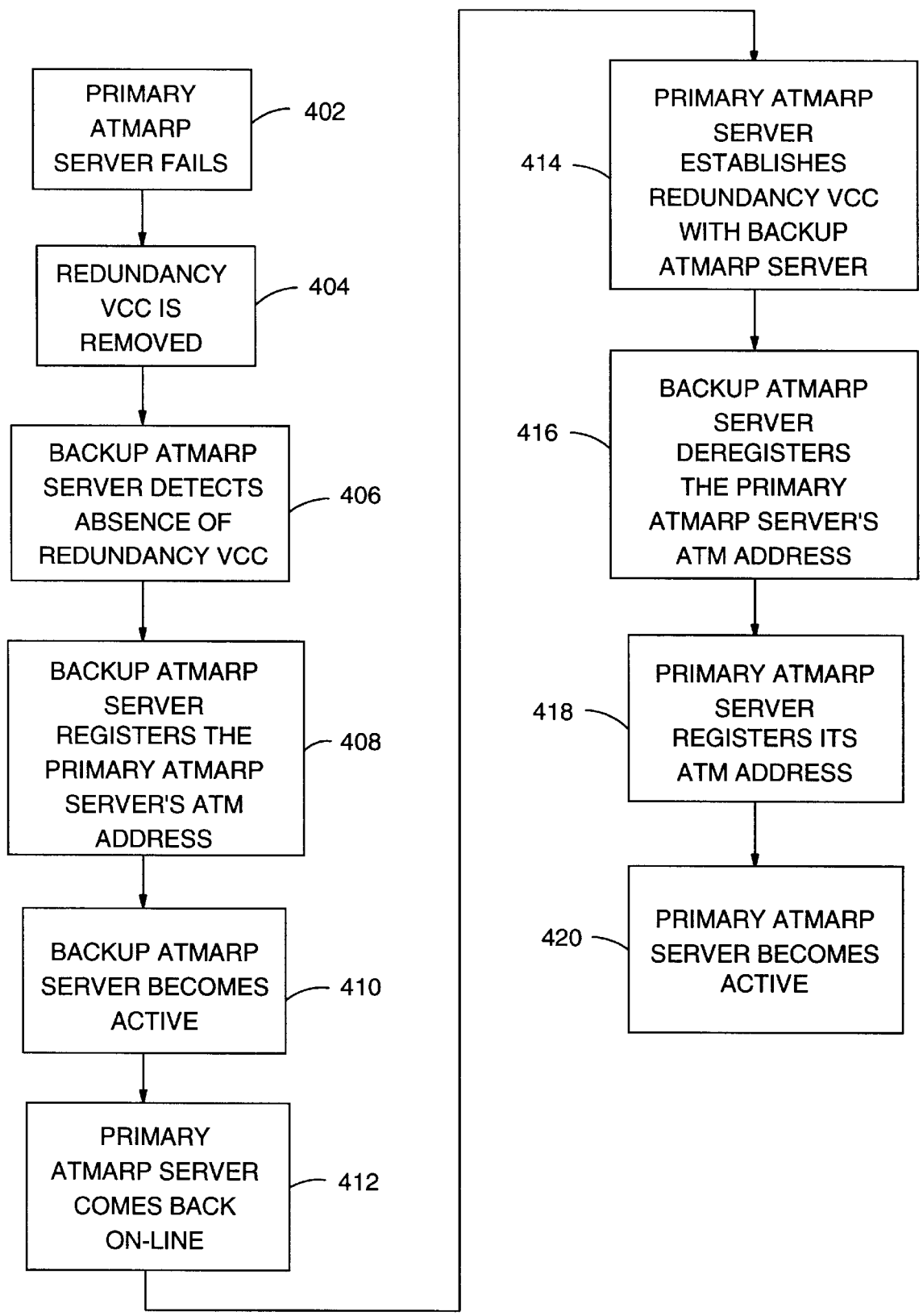
FIG. 4 is a flowchart illustrating how a backup ATMARP server takes control for a primary ATMARP server.

FIG. 4 is a flowchart which illustrates the process whereby the backup ATMARP server becomes active when the primary ATMARP server fails. After the primary ATM server fails (402), the redundancy VCC established between the primary and backup ATMARP servers is removed (404). The backup ATMARP server recognizes the removal of the redundancy VCC between itself and the primary ATMARP server (406). Upon recognizing the absence of the redundancy VCC, the backup ATMARP server registers with the ATM switch using the same ATM address as the primary ATMARP server (408). After the backup ATMARP server registers using the same ATM address as the primary ATMARP server, the backup ATMARP server becomes active (410).

Sometimes after having failed, the primary ATMARP server will come back on-line (412). At this point, the primary ATMARP server establishes the redundancy VCC with the backup ATM server (414). Upon detecting the presence of the redundancy VCC, the backup ATMARP server deregisters the primary ATMARP server's ATM address with the ATM switch (416), and the primary ATMARP server registers its ATM address (418). The primary ATMARP server then assumes its normal operating responsibilities (420).

Figure 5:
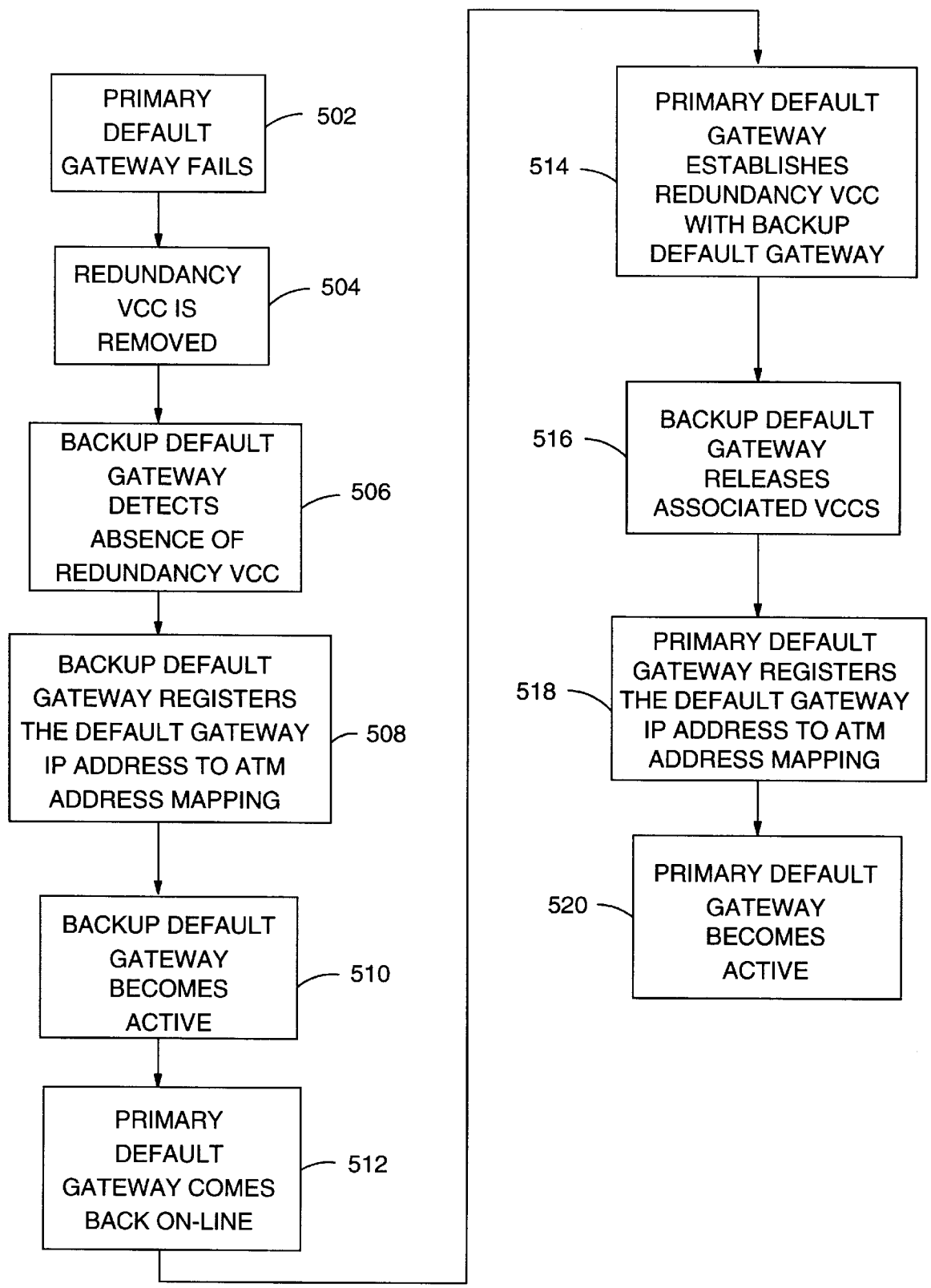
FIG. 5 is a flowchart illustrating how a backup default gateway takes control for a primary default gateway.

FIG. 5 is a flowchart which shows the process whereby the primary default gateway fails and the backup default gateway takes its place. After the primary default gateway fails (502), the redundancy VCC between the primary default gateway and the backup default gateway is removed (504). The backup default gateway detects the absence of the redundancy VCC (506), and registers a mapping between its ATM address and the default gateway IP address (508). The backup default gateway must verify the registration with the ATMARP server by ARPing for the default gateway IP address. If the ATM address returned in the ARP response does not match its ATM address, the backup default gateway must retry the registration and verification. The backup default gateway then becomes active (510).

When the primary default gateway comes back on-line (512), it reestablishes the redundancy VCC with the backup default gateway (514). Upon detecting the reestablishment of the redundancy VCC, the backup default gateway will release the VCCs associated with the default gateway, including the VCC to its ATMARP server (516). The primary default gateway then registers a mapping between its ATM address and the IP address of the default gateway (518). This allows the primary default gateway to begin/resume providing default gateway routing services for the LIS (520). The primary default gateway must verify the registration with the ATMARP server by ARPing for the default gateway IP address. If the ATM address returned in the ARP response does not match its ATM address, the primary default gateway must retry the registration and verification.

While the invention has been particularly shown and described with reference to a preferred embodiment, it will be understood by those skilled in the art that various changes in form and detail may be made therein without departing from the spirit and scope of the invention.

We claim:

1. An asynchronous transfer mode (ATM) communications network with redundant address resolution protocol (ARP) servers, comprising:

a primary ARP server and a backup ARP server, wherein both the primary and backup ARP servers are connected to the ATM communications network and wherein the primary and backup ARP servers have associated ATM addresses;

a logical internet protocol subnet (LIS), wherein the LIS is connected to the ATM communications network, and wherein an active ARP server resolves internet protocol (IP) addresses to ATM addresses for the LIS;

the primary and backup ARP servers being operable in a first switchover mode of operation, wherein the backup ARP server recognizes a removal of a redundancy virtual channel connection (VCC) between the backup ARP server and the primary ARP server; and the backup ARP server registers using the ATM address associated with the primary ARP server, wherein the backup ARP server takes over for the primary ARP server to become the active ARP server.

2. The communications network as defined in claim 1, with the primary and backup ARP servers being operable in a second switchover mode of operation, wherein the primary ARP server reestablishes the redundancy VCC to the backup ARP server, where the backup ARP server is active;

the backup ARP server deregisters its ATM address from the ATM communications network; and the primary ARP server registers its ATM address and becomes the active ARP server.

3. The communications network as defined in claim 1, wherein the primary and backup ARP servers have ATM addresses which are used to establish the redundancy VCC.

4. The communications network as defined in claim 1, further comprising a plurality of clients connected to the LIS which utilize the active ARP server to resolve IP addresses to ATM addresses.

5. The communications network as recited in claim 1, wherein the ATM addresses associated with the primary and backup ARP servers have identical end system identifiers and selectors.

6. An asynchronous transfer mode (ATM) communications network with redundant default gateways, comprising:

a primary default gateway and a backup default gateway, wherein both the primary and backup default gateways are connected to the ATM communications network and wherein ATM addresses are associated with the primary and backup default gateways;

a logical internet protocol subnet (LIS), wherein the LIS is connected to the ATM communications network; and an active default gateway for providing routing services for hosts that do not run routing topology protocols;

the primary and backup default gateways being operable in a first switchover mode of operation, wherein the backup default gateway recognizes the removal of a redundancy virtual channel connection (VCC) between the backup default gateway and the primary default gateway; and the backup default gateway registers a mapping between the ATM address associated with the backup default gateway and an IP address of the default gateway, wherein the backup default gateway takes over for the primary default gateway to become the active default gateway.

7. The communications network as defined in claim 6, with the primary and backup default gateways being operable in a second switchover mode of operation, wherein the primary default gateway reestablishes the redundancy VCC to the backup default gateway, where the backup default gateway is active;

the backup default gateway releases VCCs associated with itself; and the primary default gateway registers a mapping between the ATM address associated with the primary default gateway and the IP address of the default gateway.

8. The communications network as defined in claim 6, wherein the primary and backup default gateways have ATM addresses which are used to establish the redundancy VCC.

9. The communications network as defined in claim 6, further comprising a plurality of clients connected to the LIS which utilize the active default gateway to provide routing services.

10. The communications network as defined in claim 6, wherein the ATM communications network includes a first and a second interconnected ATM switches, where the primary default gateway is connected to the first ATM switch and the backup default gateway is connected to the second ATM switch.

11. A method of communicating using an asynchronous transfer mode (ATM) communications network with redundant address resolution protocol (ARP) servers, comprising:

providing a primary ARP server and a backup ARP server, wherein both the primary and backup ARP servers are connected to the ATM communications network and wherein the primary and backup ARP servers have associated ATM addresses;

providing a logical internet protocol subnet (LIS), wherein the LIS is connected to the ATM communications network, and wherein an active ARP server resolves internet protocol (IP) addresses to ATM addresses for the LIS;

removing a redundancy virtual channel connection (VCC) between the backup ARP server and the primary ARP server;

detecting the removal of the redundancy VCC using the backup ARP server; and registering the ATM address associated with the primary ARP server using the backup ARP server, wherein the backup ARP server takes over for the primary ARP server to become the active ARP server.

12. The method as defined in claim 11, further comprising:

reestablishing the redundancy VCC between the primary ARP server and the backup ARP server, where the backup ARP server is active;

deregistering the ATM address associated with the primary ARP server; and registering the address associated with the primary ARP server using the primary ARP server where the primary ARP server becomes the active ARP server.

13. The method as defined in claim 11, wherein the primary and backup ARP servers have ATM addresses which are used to establish the redundancy VCC.

14. The method as defined in claim 11, further comprising:

providing a plurality of clients connected to the LIS which utilize the active ARP server to resolve IP addresses to ATM addresses.

15. The communications network as recited in claim 11, wherein the ATM addresses associated with the primary and backup ARP servers have identical end system identifiers and selectors.

16. An method of communicating using an asynchronous transfer mode (ATM) communications network with redundant default gateways, comprising:

providing a primary default gateway and a backup default gateway, wherein both the primary and backup default gateways are connected to the ATM communications network and wherein ATM addresses are associated with the primary and backup default gateways;

providing a logical internet protocol subnet (LIS), wherein the LIS is connected to the ATM communications network, and an active default gateway which provides routing services for hosts that do not run routing topology protocols;

removing a redundancy virtual channel connection (VCC) between the backup default gateway and the primary default gateway;

recognizing the removal of the redundancy VCC using the backup default gateway; and registering a mapping between the ATM address associated with the backup default gateway and an IP address of the default gateway, wherein the backup default gateway takes over for the primary default gateway to become the active default gateway.

17. The method as defined in claim 16, further comprising:

reestablishing the redundancy VCC between the primary default gateway and the backup default gateway, where the backup default gateway is active;

releasing VCCs associated with the backup default gateway; and registering a mapping between the ATM address associated with the primary default gateway and the IP address of the default gateway, wherein the primary default gateway takes over for the backup default gateway.

18. The method as defined in claim 16, wherein the primary and backup default gateways have ATM addresses which are used to establish the redundancy VCC.

19. The method as defined in claim 16, further comprising:

providing a plurality of clients connected to the LIS which utilize the active default gateway to provide routing services.

20. The method as defined in claim 16, wherein the ATM communications network includes a first and a second interconnected ATM switches, where the primary default gateway is connected to the first ATM switch and the backup default gateway is connected to the second ATM switch.

* * * * *